(12) United States Patent
Figuerado et al.

(10) Patent No.: US 8,035,961 B2
(45) Date of Patent: Oct. 11, 2011

(54) CONTROLLED COMPRESSION OF HARD DRIVE CARRIER CAM

(75) Inventors: Stephen N. Figuerado, Round Rock, TX (US); Edmond Bailey, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 12/574,224

(22) Filed: Oct. 6, 2009

(65) Prior Publication Data
US 2011/0080705 A1 Apr. 7, 2011

(51) Int. Cl.
*G06F 1/16* (2006.01)

(52) U.S. Cl. .................................. 361/679.37

(58) Field of Classification Search ............ 361/679.33, 361/679.37, 679.39
See application file for complete search history.

(56) References Cited

U.S. PATENT DOCUMENTS

| | | |
|---|---|---|
| 5,652,695 A | 7/1997 | Schmitt |
| 5,734,557 A | 3/1998 | McAnally et al. |
| 6,058,016 A | 5/2000 | Anderson et al. |
| 6,088,221 A | 7/2000 | Bolognia |
| 6,166,901 A | 12/2000 | Gamble et al. |
| 6,304,439 B1 | 10/2001 | Anderson |
| 6,356,441 B1 | 3/2002 | Claprood |
| 6,487,071 B1 * | 11/2002 | Tata et al. ............... 361/679.34 |
| 6,490,153 B1 * | 12/2002 | Casebolt et al. ......... 361/679.33 |
| 6,560,098 B1 * | 5/2003 | Beinor et al. ............ 361/679.39 |
| 6,612,667 B2 | 9/2003 | Tsai et al. |
| 6,637,719 B2 | 10/2003 | Jiang |
| 6,661,651 B1 | 12/2003 | Tanzer et al. |
| 6,819,555 B2 | 11/2004 | Bolognia et al. |
| 6,854,174 B2 * | 2/2005 | Jiang ...................... 361/679.33 |
| 6,876,547 B2 | 4/2005 | McAlister |
| 6,952,341 B2 | 10/2005 | Hidaka et al. |
| 7,072,177 B2 * | 7/2006 | Peng et al. ............... 361/679.33 |
| 7,280,352 B2 | 10/2007 | Wilson et al. |
| 7,321,489 B2 | 1/2008 | McAlister |
| 7,447,011 B2 | 11/2008 | Wade et al. |
| 7,511,953 B2 * | 3/2009 | Tao et al. ................. 361/679.39 |
| 7,808,777 B2 * | 10/2010 | Luo ......................... 361/679.37 |
| 2002/0101708 A1 * | 8/2002 | Cheng ........................... 361/685 |
| 2004/0190266 A1 * | 9/2004 | Chung ........................... 361/685 |
| 2007/0211422 A1 * | 9/2007 | Liu et al. ....................... 361/685 |
| 2008/0013272 A1 | 1/2008 | Bailey et al. |

* cited by examiner

*Primary Examiner* — Lisa Lea Edmonds
(74) *Attorney, Agent, or Firm* — Haynes and Boone, LLP

(57) ABSTRACT

A cam lock apparatus includes a carrier having a bezel with a locking cam handle. The locking cam handle is pivotally attached to the bezel by a pivot pin. A resilient member is compressed between the pivot pin and the locking cam handle, whereby the first end of the locking cam handle is biased to move relative to the bezel and the carrier.

20 Claims, 13 Drawing Sheets

CONTROLLED COMPRESSION OF HARD DRIVE CARRIER CAM

BACKGROUND

The present disclosure relates generally to information handling systems, and more particularly to a media carrier used in such systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Hard drive performance can be affected by rotational vibration of system components. To help manage degradation of hard drive performance, hot plug carrier precedent is to reliably mate installed hard drive carriers to a chassis hard stop feature using a compressive load. The accomplish this, a combination of pivoting handles and cams have been provided using compliant materials, e.g. plastics. These materials then must absorb mating chassis and carrier tolerance stack variations by intentionally interfering, sometimes referred to as over-mating. Factors contributing to tolerance stack variations include a combination of handle, bezel, carrier and chassis backplane tolerances.

The intentional interference tends to create excessive stress and strain on components under load. With continued use, the compliant materials under load, used in elements of the carrier, tend to creep away from compressive forces and approach a zero loading prematurely, during the life of the product.

Accordingly, it would be desirable to provide an improved hard drive carrier absent the disadvantages discussed above.

SUMMARY

According to one embodiment, a cam lock apparatus includes a carrier having a bezel with a locking cam handle. The locking cam handle is pivotally attached to the bezel by a pivot pin. A resilient member is compressed between the pivot pin and the first end of the locking cam handle, whereby the locking cam handle is biased to move relative to the bezel and the carrier.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
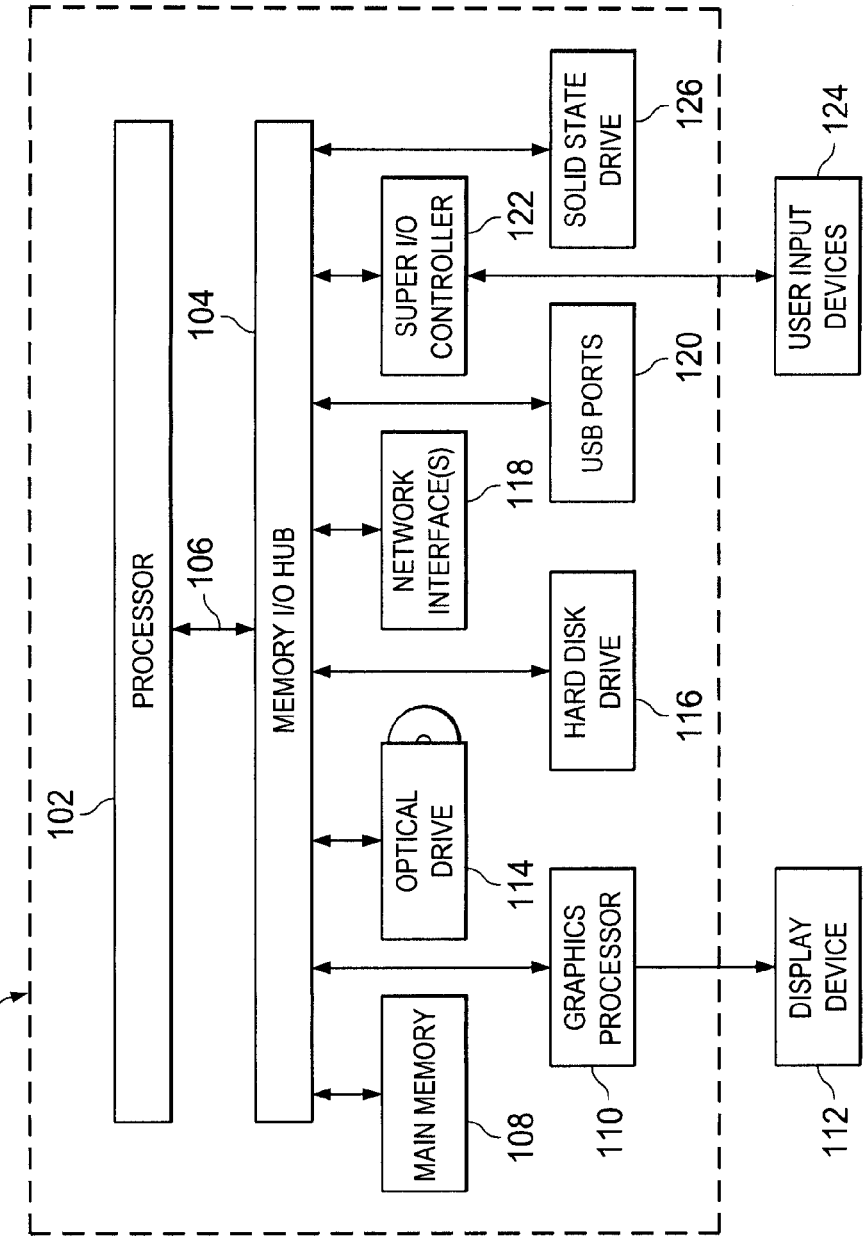
FIG. 1 is a diagrammatic view illustrating an embodiment of an IHS.

FIG. 1 is a block diagram of an IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116 and 126 may be located locally with the IHS 100, located remotely from the IHS 100, and/or they may be virtual with respect to the IHS 100. Portions of the system 100 may be provided in an IHS chassis 130, FIG. 1. Other parts of the system 100 such as display 112 and input devices 124, such as a mouse and a keyboard for example are peripherally attached to the system 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
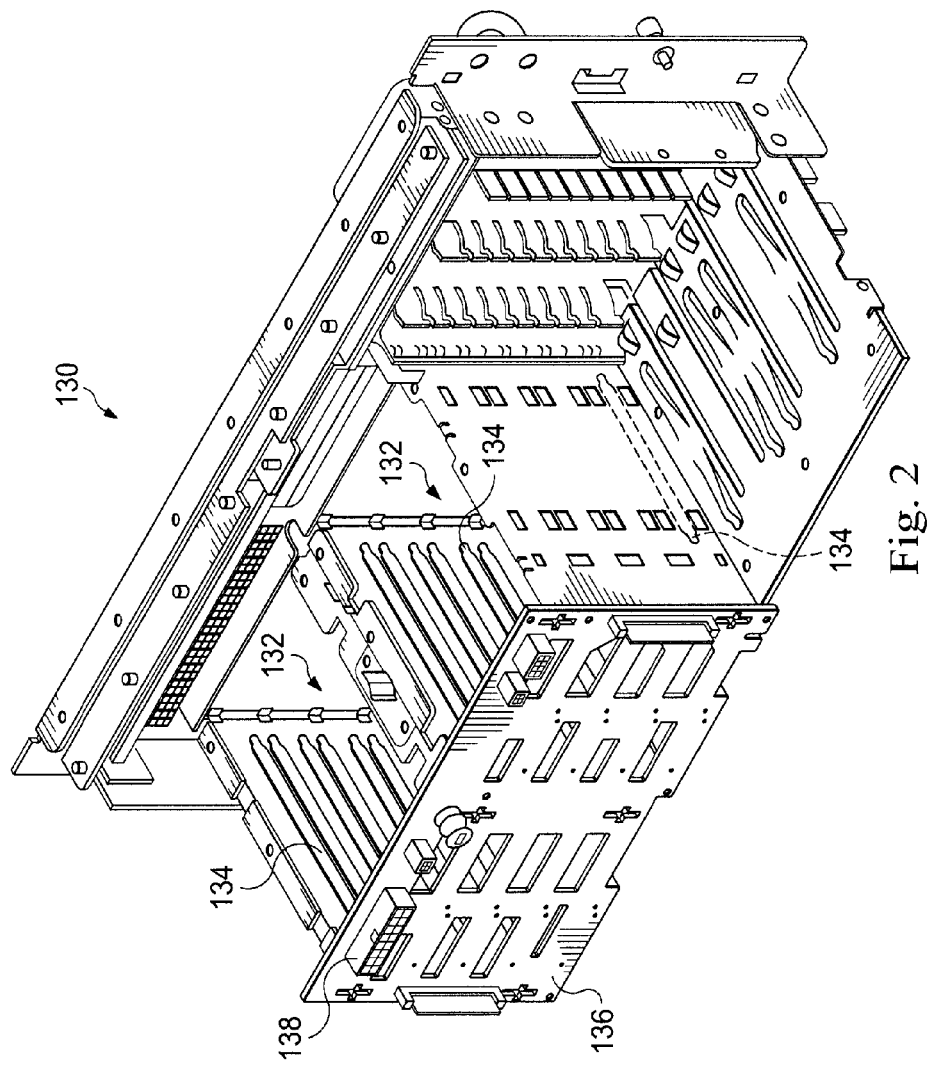
FIG. 2 is a perspective view illustrating an embodiment of an IHS chassis.
Figure 3:
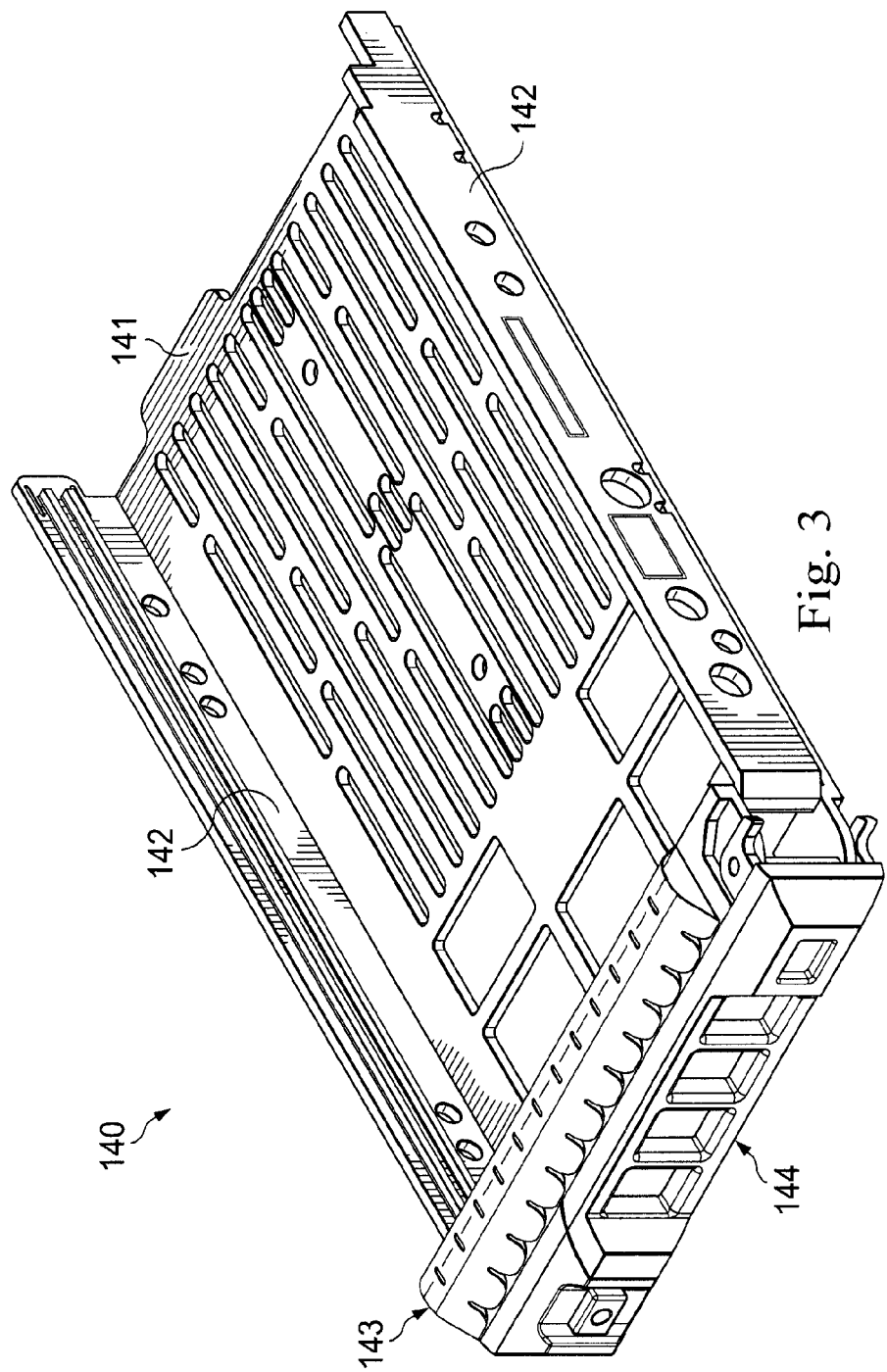
FIG. 3 is a perspective view illustrating an embodiment of a media carrier.
Figure 4:
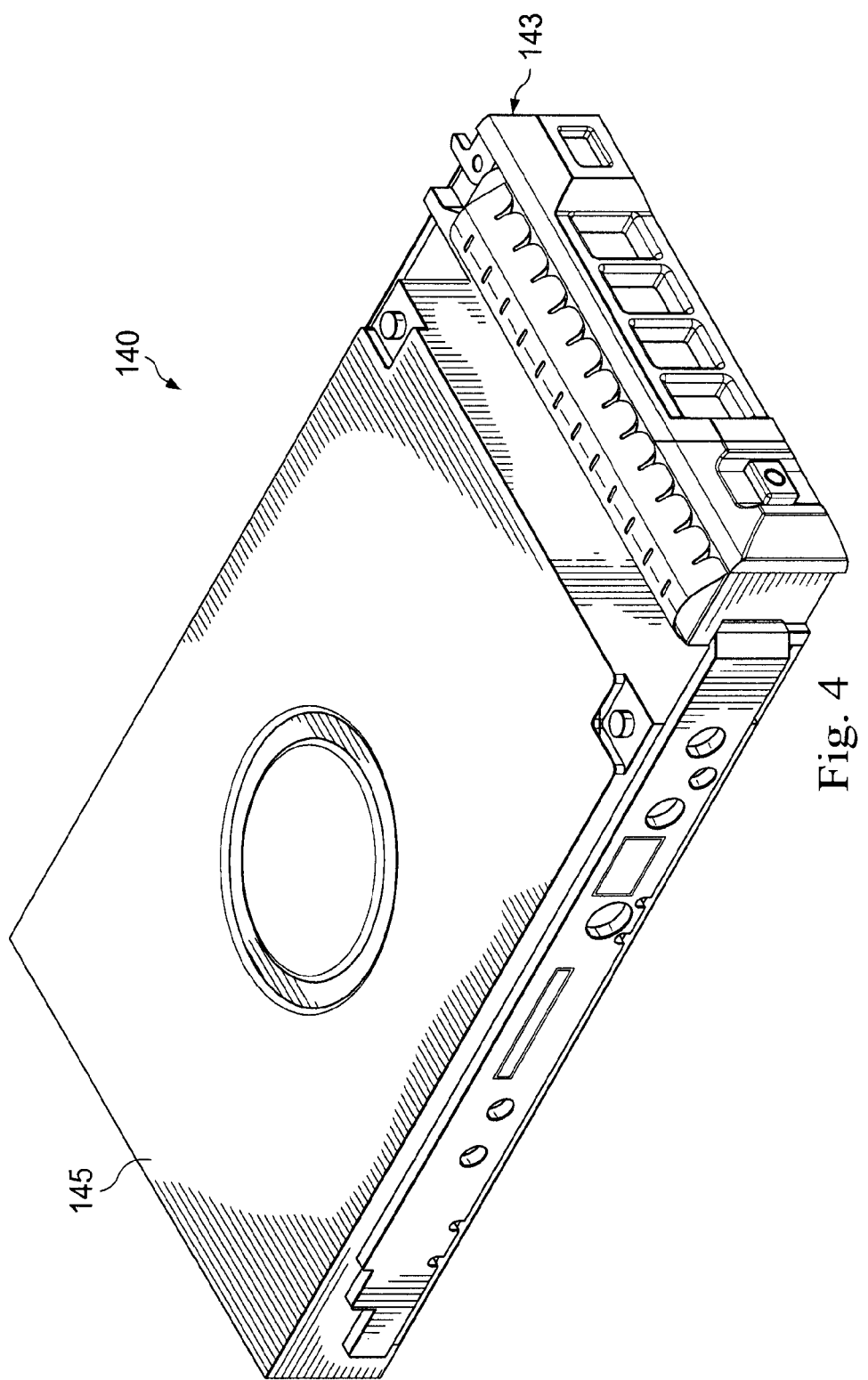
FIG. 4 is a perspective view illustrating an embodiment of a carrier including a hard drive.
Figure 5:
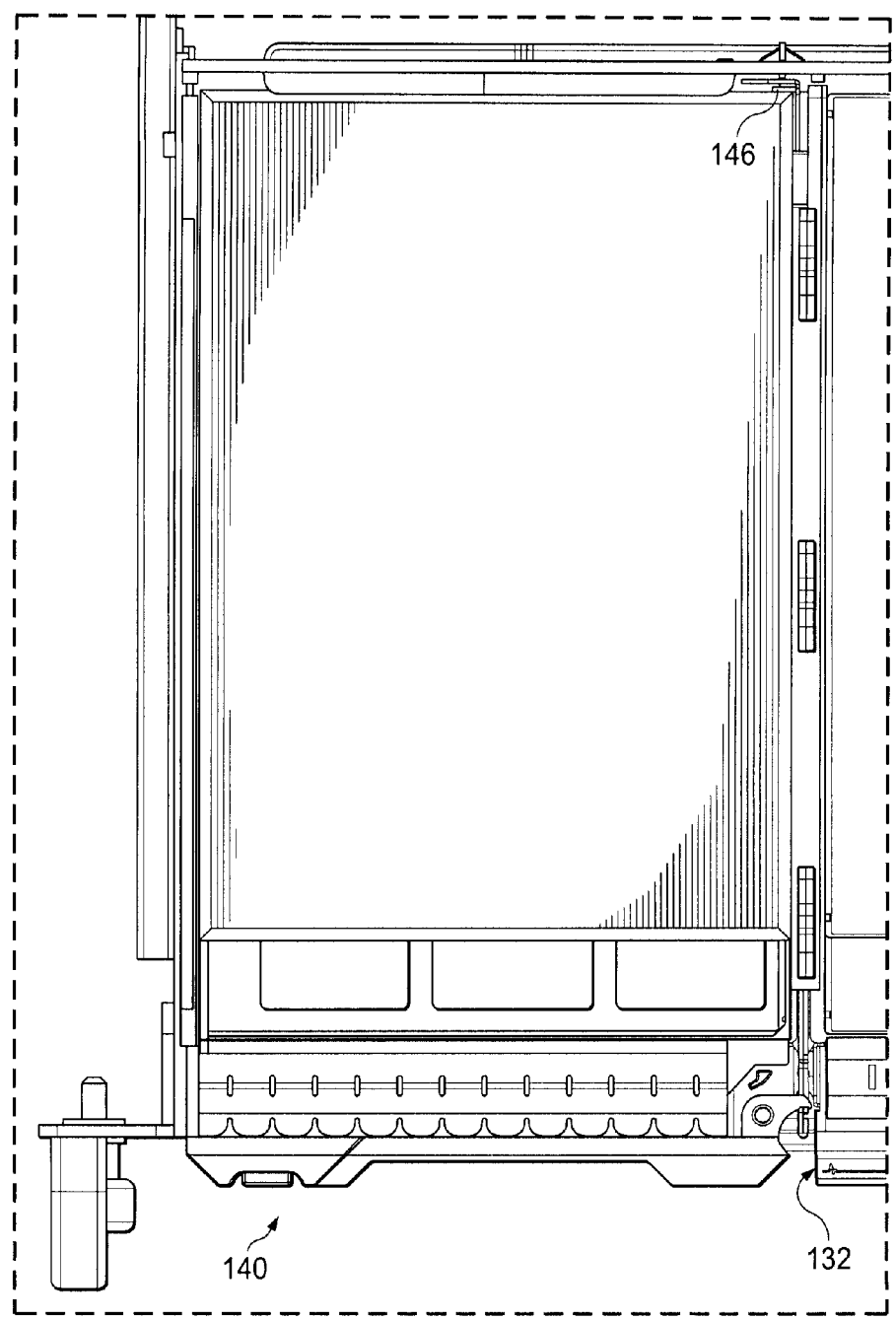
FIG. 5 is a top view illustrating an embodiment of a media carrier mounted in a chassis bay.
Figure 6:
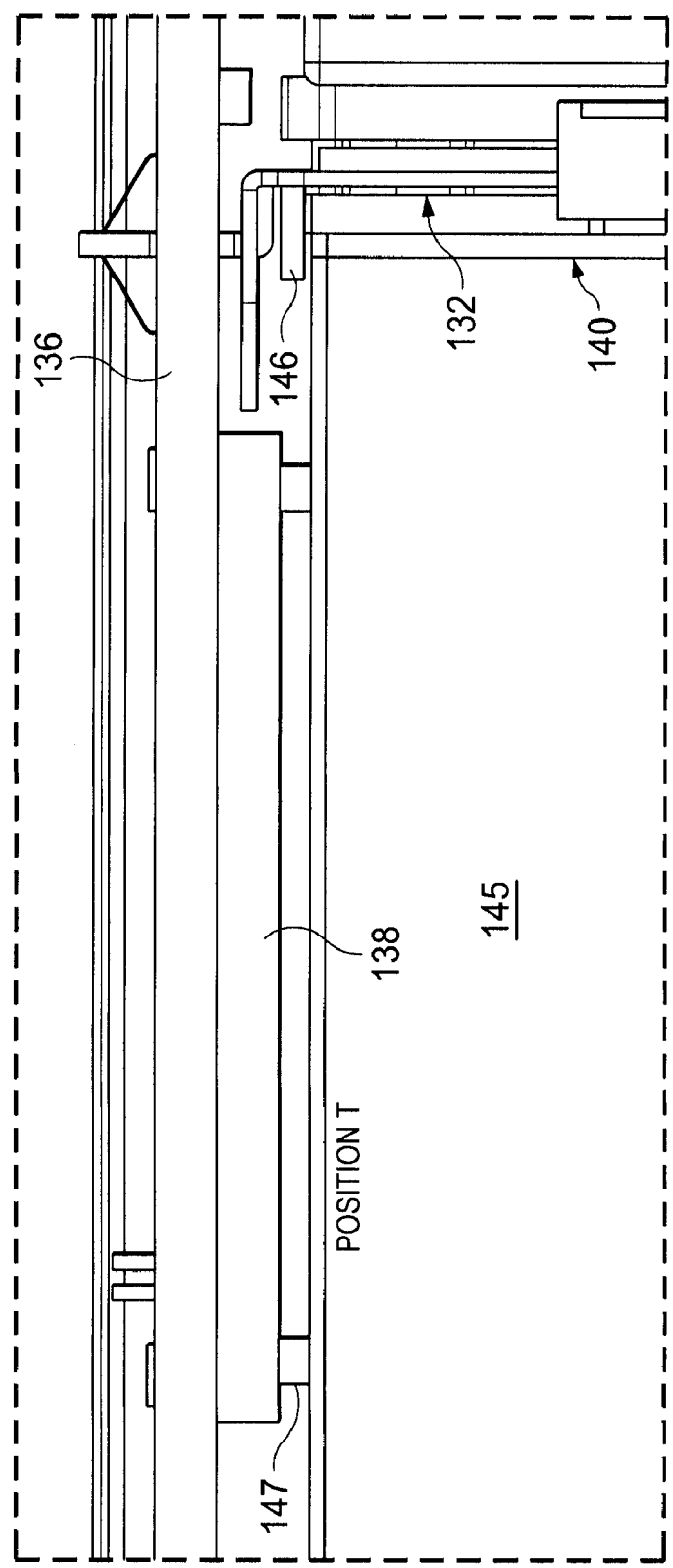
FIG. 6 is a partial top view illustrating an embodiment of a media carrier engaged with a stop in a chassis bay.

In FIG. 2, an exemplary system chassis 130 is illustrated including a plurality of carrier bays 132. Each bay 132 includes sidewalls 134 and a backplane 136 having plug connections 138. An exemplary carrier 140, FIG. 3, includes a base 141, a pair of siderails 142 and a bezel 143 having a locking cam handle 144, see also FIG. 4. A media component such as a hard drive 145, FIG. 4, is mounted in the carrier 140. The carrier 140 is inserted into bay 132, FIGS. 5 and 6, and moved to a terminal position T wherein one siderail 142 mates with a hard stop 146. In this position, an electrical connector 147 of the carrier hard drive component 145 is seated in the plug connection 138 of the backplane 136.

Figure 7:
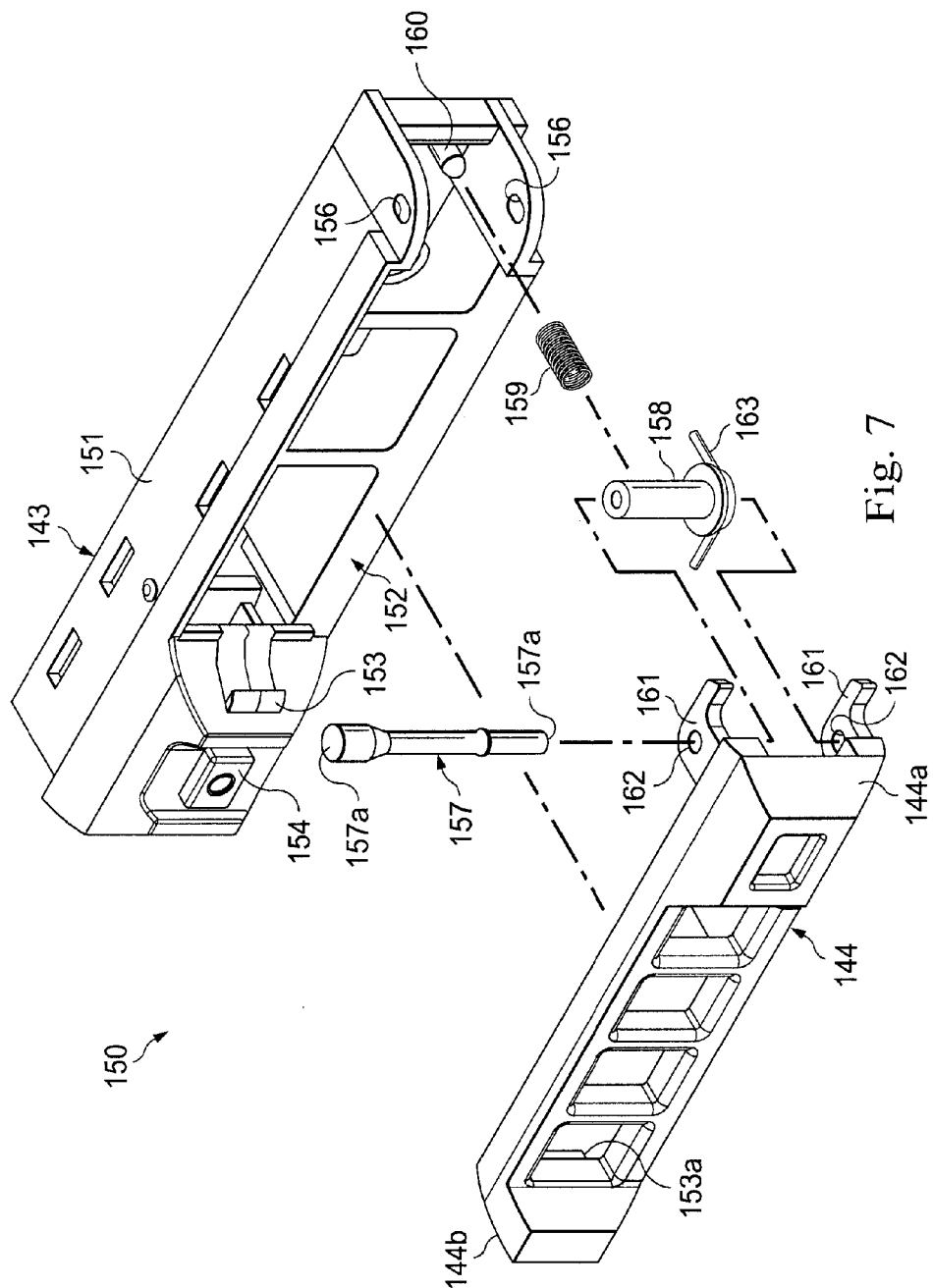
FIG. 7 is an exploded perspective view illustrating an embodiment of a cam lock device.
Figure 7A:
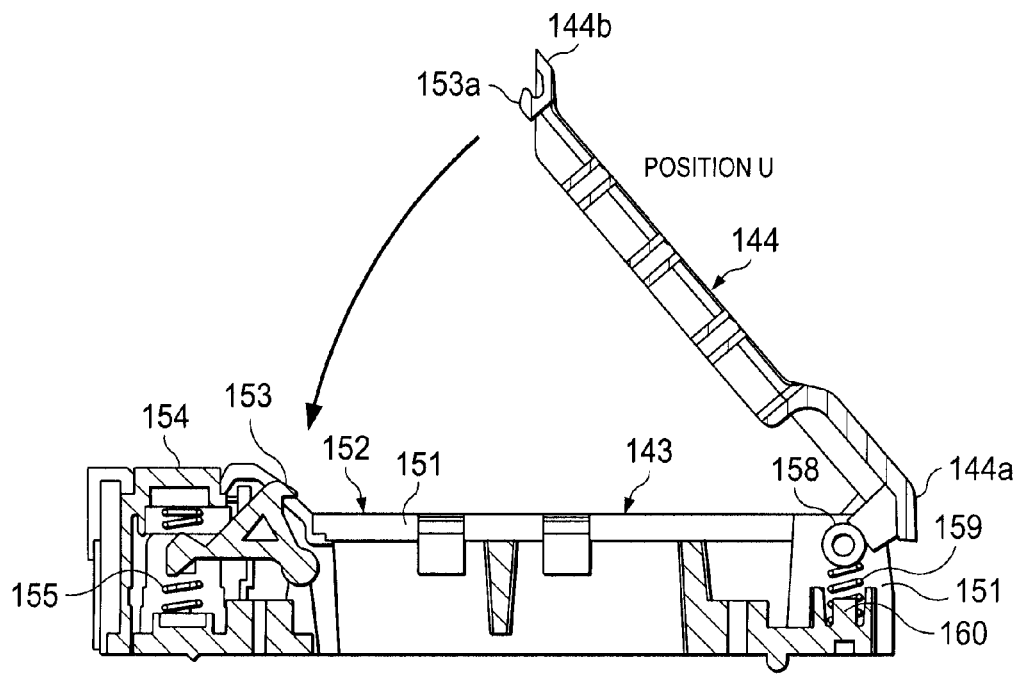
FIG. 7a is a cutaway top view illustrating an embodiment of the cam lock device including a pivotable handle in an unlatched position.
Figure 8:
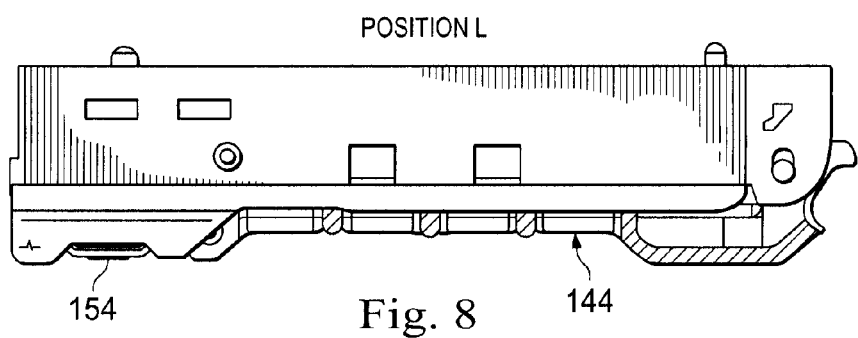
FIG. 8 is a top view illustrating an embodiment of the cam lock device including the handle in a latched position.
Figure 9:
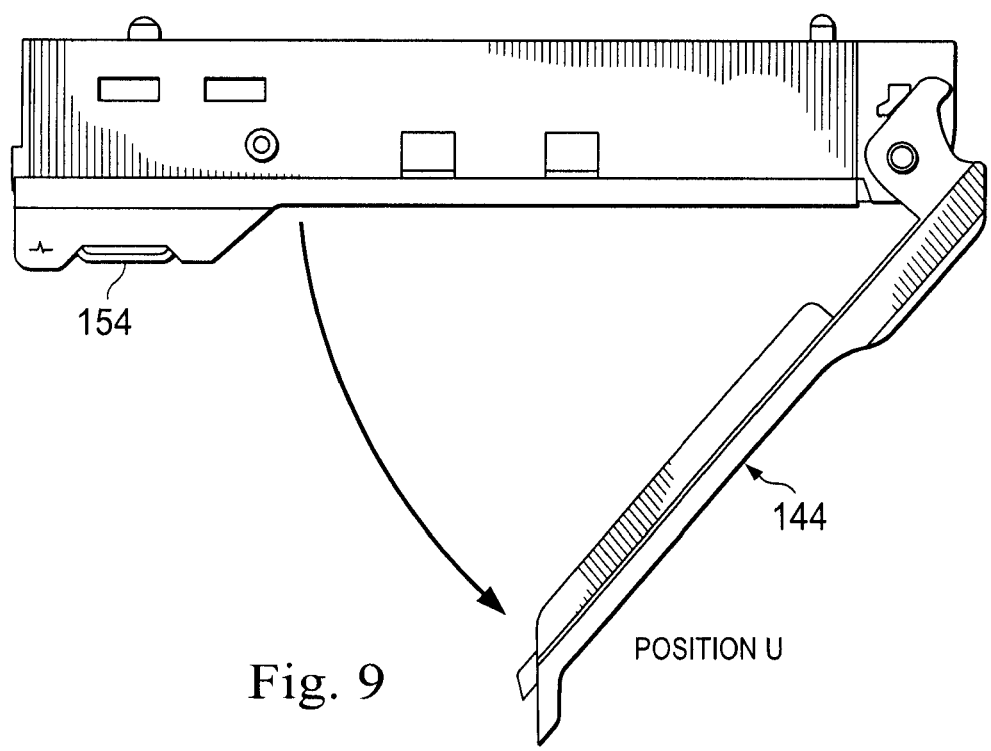
FIG. 9 is a top view illustrating an embodiment of the cam lock device including the handle in the unlatched position.

In order to insure full seating of the carrier 140 and hard drive component 145, absorb mating chassis and carrier tolerance stack variations, and maintain a positive loading on the carrier seating without over stressing components, a cam lock device is provided including the bezel 143 and locking cam handle 144, FIGS. 7 and 7a. The bezel 143 includes a synthetic material frame 151 including a cavity 152 for the lock cam handle 144, a first catch 153 for the locking cam handle 144 and a release 154, resiliently mounted via a resilient member 155, FIG. 7a, for releasing the catch 153. A pair of slotted openings 156 in the frame 151 receive a pivot pin 157. The slotted openings 156 permit movement of the pivot pin 157. A pivot pin shroud 158 seats in the frame 151 and houses the pivot pin 157. An exemplary resilient member, preferably a compression spring 159, is mounted on a seat 160 and is compressed between the seat 160 and the pivot pin shroud 158. As a result, the pivot pin 157 and shroud 158 are urged away from the seat 160 as movement of the pin 157 is permitted in the slotted openings 156. The locking cam handle 144 is formed of a suitable metal alloy and seats in the cavity 152 and includes a pair of hooks 161 and a pair of openings 162 for receiving the terminal ends 157a of the pivot pin 157. The openings 162 in the locking cam handle 144 are aligned with the slots 156 in the bezel 143. The hooks 161 and openings 162 are at a first end 144a of the handle 144. In this manner, when assembled, movement of the pivot pin 157 in the slots 156 also moves the first end 144a of the handle 144. A second end 144b of the handle 144 includes a second catch 153a for mating engagement with the first catch 153. A torsion spring 163 mounted on the shroud 158, functions to rotate the handle 144 from a lock position L to an unlock position U upon actuation of the release 154, see FIGS. 8 and 9.

Figure 10:
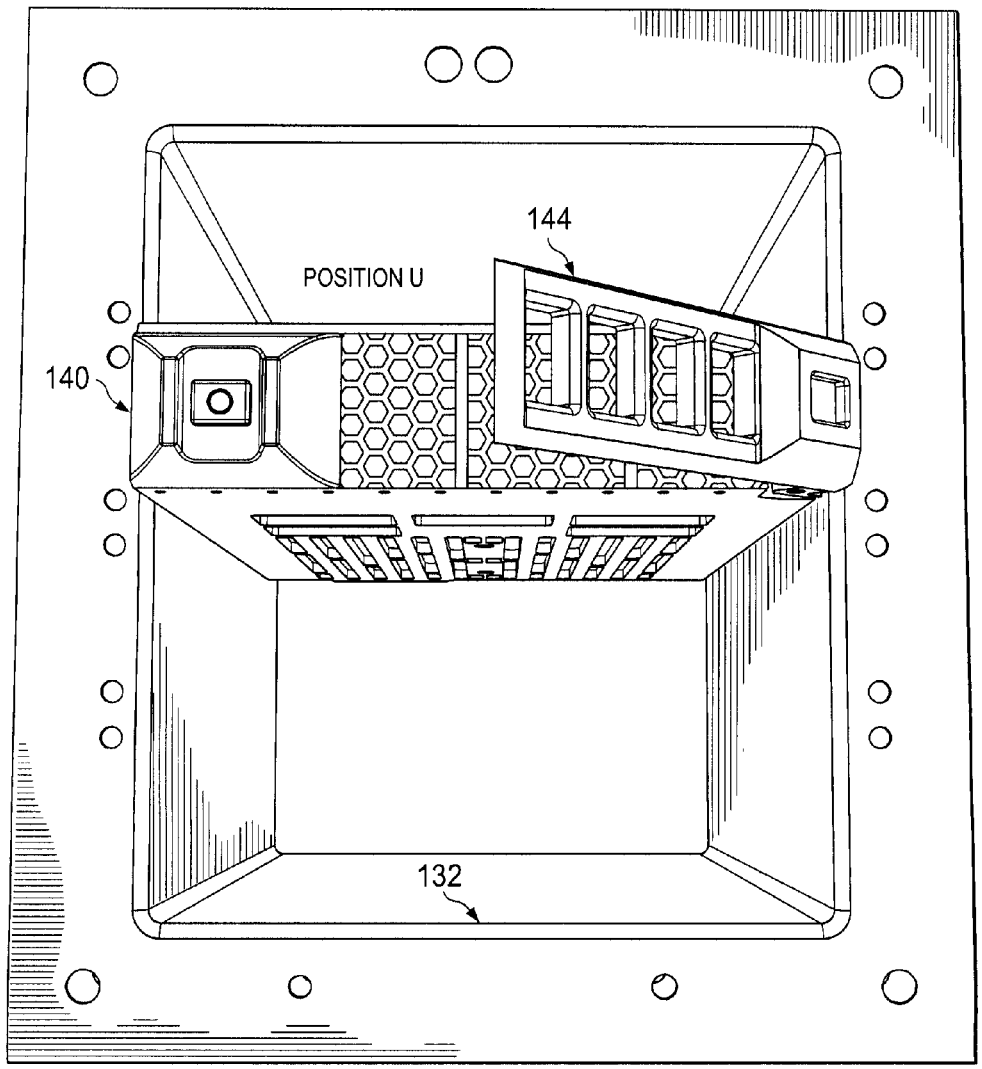
FIG. 10 is a perspective view illustrating an embodiment of a media carrier partially inserted in a chassis bay and including the handle in the unlatched position.
Figure 11:
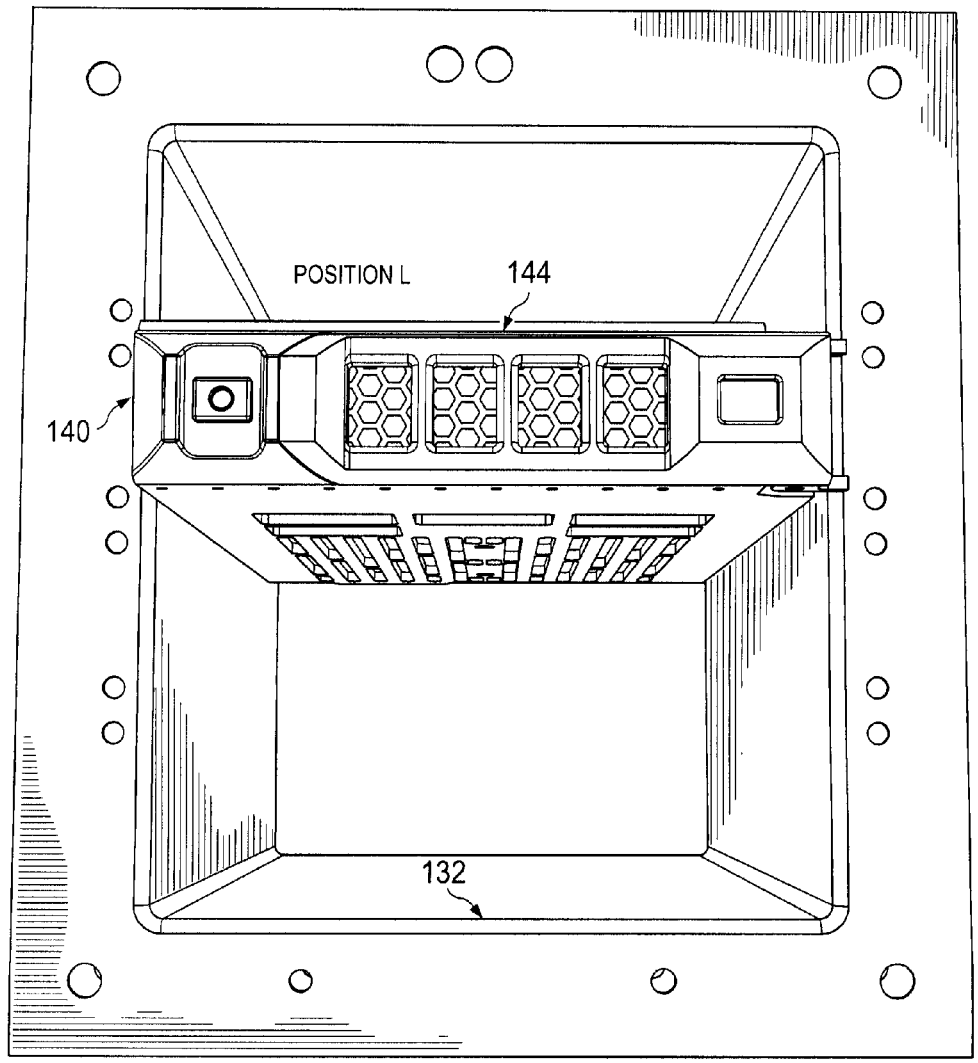
FIG. 11 is a perspective view illustrating an embodiment of the media carrier fully inserted in the chassis bay including the handle in the latched position.
Figure 12:
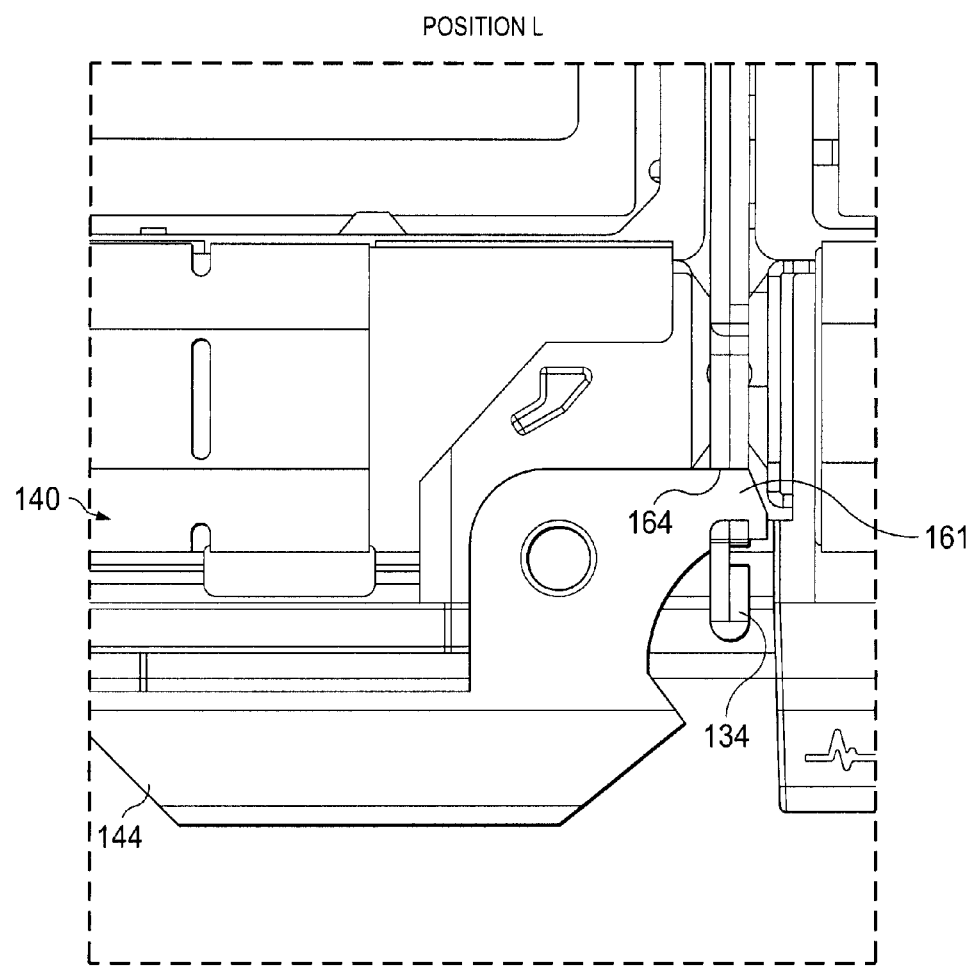
FIG. 12 is a partial cutaway view illustrating the cam lock device locked into engagement with a chassis bay.
Figure 13:
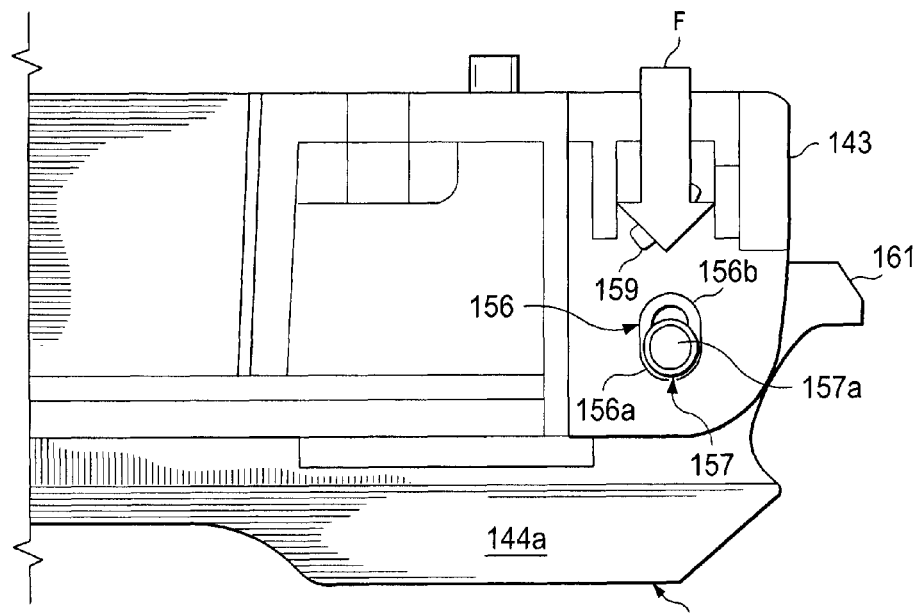
FIG. 13 is a partial cutaway view illustrating the cam lock device in an at rest position.
Figure 14:
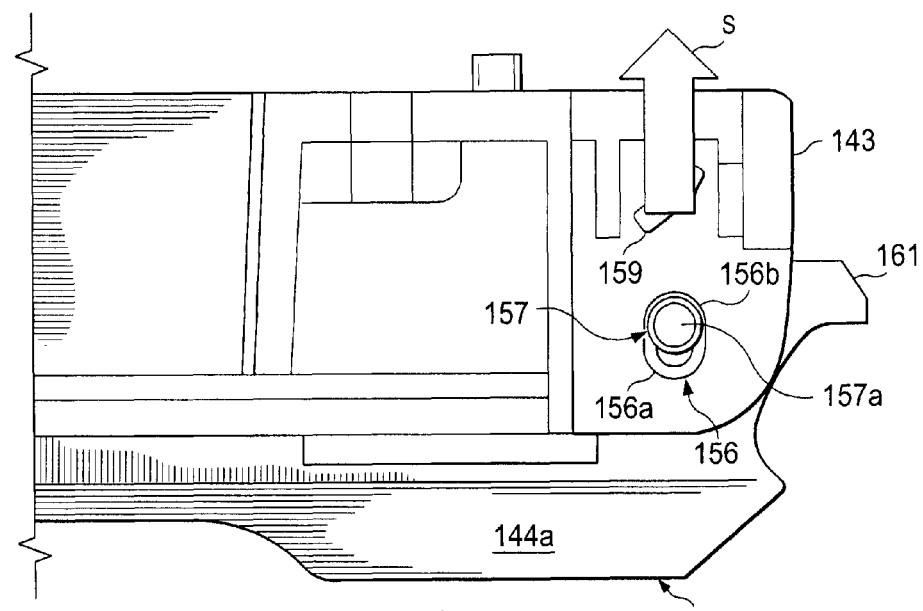
FIG. 14 is a partial cutaway view illustrating the cam lock device in a compressed position.

Upon insertion of the carrier 140 into the bay 132, FIGS. 10, 11 and 12, the handle 144 is in the unlock position U, FIG. 10. The carrier 140 is seated when the stop 146 is engaged as discussed above, and when the handle 144 is moved to the lock position L, FIG. 11. The positive loading on the carrier 140 is enhanced by movement of the handle 144 to the lock position L wherein the hooks 161 engage an opening 164 in the bay sidewall 134, FIG. 12. The positive loading is insured due to the relative movement of the pin 157 in the slot 156, see FIGS. 13 and 14. Movement is permitted along the length of the slot 156. The resilient member 159 urges the pin 157 in a first direction, to a first end 156a of slot 156 indicated by an arrow designated F, to an at rest position, FIG. 13, and compression of the resilient member 159 permits movement of the pin 157 toward an opposite end 156b of the slot 156 in a second direction, indicated by an arrow designated S, FIG. 14. Because the bezel 143 is connected to the carrier 140, not shown in FIGS. 13 and 14, the carrier 140 and bezel 143 move together relative to the first end 144a of the handle 144. Thus, due to the resiliently mounted metal hooks 161 engaged with the sidewall 134 of chassis 130, FIG. 12, a positive load can be maintained on the carrier 140 in the terminal position T without material degradation resulting in the aforementioned zero loading.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cam lock apparatus comprising:
   a carrier;
   a cam handle including a first end that is pivotally coupled to the carrier by a pivotal connector, wherein the pivotal connector is moveably coupled to the carrier such that the pivotal connector includes a linear range of motion relative to the carrier;
   and
   a resilient member coupled to the carrier and the pivotal connector, to resiliently the pivotal connector along the linear range of motion relative to the carrier.

2. The apparatus of claim 1, further comprising:
   a bezel coupled to the carrier, wherein the bezel includes a pivotal coupling that engages the pivotal connector to moveably couple the pivotal connector to the carrier.

3. The apparatus of claim 2, wherein the pivotal coupling includes a plurality of slots defined by the bezel, and wherein the pivotal connector is located in the slots and moveable along the linear range of motion through the slots.

4. The apparatus of claim 1, further comprising:
   a second end of the cam handle that is located opposite the first end, wherein the second end is operable to engage a catch that is coupled to the carrier in response to pivotal motion of the cam handle relative to the carrier.

5. The apparatus of claim 4, wherein the pivotal connector is operable to move along the linear range of motion in response to the pivotal motion of the cam handle relative to the carrier to engage the second end of the cam handle and the catch.

6. The apparatus of claim 1, wherein the pivotal connector includes a pivot pin, and wherein the resilient member includes a spring.

7. The apparatus of claim 6 wherein the pivotal connector includes a pin shroud in which the pivot pin is located and which the spring engages, and wherein a torsion spring is coupled to the pin shroud in order to bias the cam handle into an unlock position.

8. An information handling system (IHS) comprising:
   a chassis;
   a processor coupled to the chassis;
   a component carrier located in the chassis and including a component that is coupled to the processor;
   a bezel connected to the carrier;
   a cam handle including a first end that is pivotally coupled to the bezel by the pivotal connector, wherein the pivotal connector is moveably coupled to the bezel such that the pivotal connector includes a linear range of motion relative to the bezel;
   and
   a resilient member coupled to the carrier and the pivotal connector to resiliently biased the pivotal connector along the linear range of motion relative to the bezel.

9. The IHS of claim 8 wherein the bezel includes a plurality of slots defined by the bezel, and wherein the pivotal connector is located in the slots and moveable along the linear range of motion through the slots.

10. The IHS of claim 8, further comprising:
    a second end of the cam handle that is located opposite the first end, wherein the second end is operable to engage a catch that is located on the bezel in response to pivotal motion of the cam handle relative to the bezel.

11. The IHS of claim 10, wherein the pivotal connector is operable to move along the linear range of motion in response to the pivotal motion of the cam handle relative to the bezel to engage the second end of the cam handle and the catch.

12. The IHS of claim 10, wherein the pivotal connector includes a pivot pin, and wherein the resilient member includes a spring.

13. The IHS of claim 12, wherein the pivotal connector includes a pin shroud in which the pivot pin is located and which the spring engages, and wherein a torsion spring is coupled to the pin shroud in order to bias the cam handle into an unlock position.

14. The IHS of claim 8, further comprising:
    at least one hook located on the first end of the cam handle, wherein the at least one hook is operable to engage the chassis to secure the carrier to the chassis when the cam handle is moved into a lock position.

15. A method of locking a component in a chassis, comprising:
    providing a carrier having a cam handle with a first end that is pivotally coupled to the carrier by a pivotal connector, wherein the pivotal connector is moveably coupled to the carrier such that the pivotal connector includes a linear range of motion relative to the carrier, and wherein the carrier also includes a resilient member that resiliently biases the pivotal connector along the linear range of motion;
    coupling a component to the carrier;
    inserting the carrier with the coupled component into a bay defined by a chassis;
    pivoting the cam handle about the pivotal connector to secure the carrier to the chassis, wherein in response to the pivoting, the pivotal connector moves along the linear range of motion relative to the carrier such that the first end of the cam handle moves relative to the carrier in order to absorb tolerance stack variations.

16. The method of claim 15 wherein the pivoting results in a second end of the cam handle, which is located opposite the cam handle from the first end, engaging a catch on the carrier to secure the carrier to the chassis.

17. The method of claim 16, wherein the pivoting results in at least one hook located on the first end of the cam handle engaging the chassis to secure the carrier to the chassis.

18. The method of claim 15, further comprising:
    a bezel including a plurality of slots defined by the bezel, wherein the pivotal connector is located in the slots and moveable along the linear range of motion through the slots.

19. The method of claim 15, wherein the pivotal connector includes a pivot pin, and wherein the resilient member includes a spring.

20. The method of claim 19, wherein the pivotal connector includes a pin shroud in which the pivot pin is located and which the spring engages, and wherein a torsion spring is coupled to the pin shroud in order to bias the cam handle into an unlock position.

* * * * *

UNITED STATES PATENT AND TRADEMARK OFFICE
CERTIFICATE OF CORRECTION

| | |
|---|---|
| PATENT NO. | : 8,035,961 B2 |
| APPLICATION NO. | : 12/574224 |
| DATED | : October 11, 2011 |
| INVENTOR(S) | : Stephen N. Figuerado and Edmond Bailey |

It is certified that error appears in the above-identified patent and that said Letters Patent is hereby corrected as shown below:

Column 5, line 17, the word "biased" should be --bias--
Column 5, line 19, after "claim 8" insert --,--

Signed and Sealed this
Thirty-first Day of July, 2012

David J. Kappos
*Director of the United States Patent and Trademark Office*